United States Patent
Choi et al.

(10) Patent No.: US 7,390,570 B2
(45) Date of Patent: Jun. 24, 2008

(54) MALEIMIDE TERMINATED RUBBER AND CURABLE COMPOSITION PRODUCED BY USING THE MALEIMIDE TERMINATED RUBBER

(75) Inventors: Wonmun Choi, Kanagawa (JP); Kazuhiro Hatanaka, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 425 days.

(21) Appl. No.: 10/524,115

(22) PCT Filed: May 13, 2004

(86) PCT No.: PCT/JP2004/006755

§ 371 (c)(1),
(2), (4) Date: Feb. 10, 2005

(87) PCT Pub. No.: WO2005/111087

PCT Pub. Date: Nov. 24, 2005

(65) Prior Publication Data

US 2005/0255322 A1 Nov. 17, 2005

(51) Int. Cl.
- B32B 27/38 (2006.01)
- B32B 27/04 (2006.01)
- B32B 27/18 (2006.01)
- C08C 19/22 (2006.01)
- C08L 15/00 (2006.01)
- C08L 63/00 (2006.01)

(52) U.S. Cl. ............ 428/413; 428/297.4; 525/374; 525/375; 525/523

(58) Field of Classification Search .......... 428/297.4, 428/413; 525/326.1, 331.9, 333.6, 374, 375, 525/523
See application file for complete search history.

(56) References Cited

U.S. PATENT DOCUMENTS

| | | | | |
|---|---|---|---|---|
| 2,818,405 A | * | 12/1957 | Kovacic | 528/322 |
| 5,364,700 A | * | 11/1994 | Domeier | 428/394 |
| 5,446,080 A | | 8/1995 | Shima et al. | |
| 5,532,296 A | * | 7/1996 | Recker et al. | 523/400 |
| 5,609,956 A | * | 3/1997 | Sakumoto et al. | 428/352 |
| 6,265,530 B1 | | 7/2001 | Herr et al. | |
| 6,506,849 B1 | | 1/2003 | Hojo et al. | |

FOREIGN PATENT DOCUMENTS

| CN | 1106831 A | 8/1995 |
|---|---|---|
| EP | 0 390 565 A2 | 10/1990 |
| WO | WO 94/22680 | * 10/1994 |

OTHER PUBLICATIONS

Definition of imino, provided by YourDictionary.com (2008); http://www.yourdictionary.com/imino.*
Definition of imine, provided by YourDictionary.com (2008); http://www.yourdictionary.com/imine.*
B.F. Goodrich Chemical Company, Polymer Additives Division, Hycar Reactive Liquid Polymers Technical Presentation.
A. J. Kinloch et al., "Deformation and fracture behaviour of a rubber-toughened epoxy: 1. Microstructure and fracture studies", Polymer, 1983, vol. 24, October, pp. 1341-1354.
A. J. Kinloch et al., "Deformation and fracture behaviour of a rubber-toughened epoxy: 2. Failure criteria", Polymer, 1983, vol. 24, October, pp. 1355-1363.
English language tranlation of PCT International Preliminary Report Patentability dated Nov. 23, 2006.
B.F. Goodrich Chemical Company, Polymer Additives Division, Hycar Reactive Liquid Polymers Technical Presentation, no date.
Adv. Polym. Techn., 1994, vol. 13, pp. 141-147 (CAPLUS, paper, AN: 1995:15915) (Abstract of).
Polym-Eng. Sci., 1991, vol. 31, pp. 563-566 (paper high molecular report 1992, H1168/ 92) (Abstract of).

* cited by examiner

*Primary Examiner*—Michael J Feely
(74) *Attorney, Agent, or Firm*—Connolly Bove Lodge & Hutz LLP

(57) ABSTRACT

An object of the present invention is to provide a curable composition which exhibits excellent toughness after the curing and excellent long term stability, as well as a rubber used in such curable composition. Such object is realized by a maleimide terminated rubber having maleimide structure on both ends of the molecule obtainable by reacting a rubber having amino group and/or imino group on both ends of the molecule and a bismaleimide compound, as well as a curable composition comprising such maleimide terminated rubber and a resin and/or a rubber other than such maleimide terminated rubber.

2 Claims, No Drawings

MALEIMIDE TERMINATED RUBBER AND CURABLE COMPOSITION PRODUCED BY USING THE MALEIMIDE TERMINATED RUBBER

TECHNICAL FIELD

This invention relates to a curable composition which exhibits excellent long-term stability as well as toughness after curing, and a rubber used in such curable composition.

BACKGROUND ART

A liquid rubber having amine structure on both ends of the molecule (hereinafter referred to as an "amine terminated rubber") has been known in the art (see, for example, B. F. Goodrich Chemical Company, Technical Data, A. J. Kinloch, S. J. Shaw, D. A. Tod and D. L. Hunston, Polymer, 24, 1341, (1983) and A. J. Kinloch, S. J. Shaw and D. L. Hunston, Polymer, 24, 1355 (1983)). These amine terminated rubber has a rubber backbone and a reactive amine structure on both ends of the molecule, and therefore, these rubbers have been used for the purpose of imparting toughness (the property which enables bending without fracture) to a thermosetting resin. For example, epoxy resin is used for various applications owing to its excellent dynamic properties (for example, modulus) and heat resistance. However, epoxy resin is insufficient in the toughness required in some particular applications, and the amine terminated rubber is used in such applications.

However, when the amine terminated rubber that had been known in the art was used in combination with a thermosetting resin such as epoxy resin, the resulting composition exhibited insufficient long term stability since the amine terminated rubber had low molecular weight, and the amine terminated rubber was highly reactive with a group such as epoxy group.

DISCLOSURE OF THE INVENTION

An object of the present invention is to provide a curable composition which exhibits excellent toughness after the curing as well as excellent long term stability, and another object of the present invention is to provide a rubber used in such curable composition.

A further object of the present invention is to provide a composite molded article produced by using the curable composition as described above.

The inventors of the present invention have made an intensive study on the amine terminated rubber and the curable composition using the amine terminated rubber, and found that, when a bismaleimide compound is reacted with the amine structure of the amine terminated rubber for conversion of both ends into bismaleimide structure, toughness of the curable composition can be improved simultaneously with the long term stability. The inventors also found that, when the curable composition contains epoxy resin, improvements in strength and other dynamic properties as well as heat resistance are realized. The present invention has been completed on the bases of such findings.

The present invention provides (1) to (7) as described below.

(1) A maleimide terminated rubber having maleimide structure on both ends of the molecule obtainable by reacting a rubber having amino group and/or imino group on both ends of the molecule and a bismaleimide compound.

(2) A curable composition comprising the maleimide terminated rubber of the above (1) and a resin and/or a rubber other than the maleimide terminated rubber.

(3) The curable composition according to the above (2) further comprising a curing agent having a functional group capable of reacting with the maleimide structure.

(4) The curable composition according to the above (3) wherein the functional group is at least one member selected from a group consisting of amino group, imino group, thiol group, and diene structure.

(5) The curable composition according to the above (3) wherein the resin is epoxy resin, and the functional group is at least one member selected from a group consisting of amino group, imino group, and thiol group.

(6) A composite molded article wherein the curable composition of any one of the above (1) to (5) is used.

(7) A prepreg wherein the curable composition of the above (5) is used.

The maleimide terminated rubber of the present invention has a rubber backbone, a relatively high molecular weight, and maleimide structure on both ends of the molecule which has relatively low reactivity at ambient temperature. As a consequence, the curable composition of the present invention produced by using the maleimide terminated rubber of the present invention exhibits excellent toughness after the curing as well as excellent long term stability, and such composition is highly adapted for use in applications such as composite molded articles. Among such curable composition of the present invention, those including epoxy resin are highly adapted for use in applications such as prepreg since the composition exhibits superior dynamic properties and heat resistance compared to the compositions free from the maleimide terminated rubber of the present invention.

BEST MODE FOR CARRYING OUT THE INVENTION

Next, the present invention is described in detail. First, maleimide terminated rubber of the present invention is described.

The maleimide terminated rubber of the present invention is a rubber having maleimide structure on both ends of the molecule obtainable by reacting a rubber having amino group and/or imino group on both ends of the molecule with a bismaleimide compound.

The rubber having the amino group and/or imino group on both ends of the molecule used in the present invention is not particularly limited for its backbone. Exemplary rubbers include those having the amino group and/or imino group introduced into both ends of the molecule having the skeleton of a conventional known diene rubber or its hydrogenation product (for example, natural rubber, epoxidated natural rubber, isoprene rubber, styrene-butadiene rubber, hydrogenated styrene-butadiene rubber, butadiene rubber (high cis butadiene rubber or low cis butadiene rubber), acrylonitrile-butadiene rubber (NBR), or hydrogenated acrylonitrile-butadiene rubber), olefin rubber (for example, ethylene-propylene rubber, ethylene-propylene-diene rubber, maleic modified ethylene-propylene rubber, butyl rubber, copolymer of isobutylene or an aromatic vinyl or diene monomer, acrylic rubber, or ionomer), halogen-containing rubber (for example, brominated butyl rubber, chlorinated butyl rubber, brominated isobutylene-paramethyl styrene copolymer, chloroprene rubber, hydrine rubber, chlorosulfonated polyethylene, chlorinated polyethylenes, or maleic modified chlorinated polyethylene), silicone rubber (for example, methylvinyl silicone rubber, or methylphenylvinyl silicone rubber), sulfur-containing rubber (for example, polysulfide rubber), fluorocarbon rubber (for example, vinylidene fluoride rubber, fluorine-containing vinyl ether rubber, or fluorine-containing phosphazene rubber), urethane rubber, liquid polyisoprene, liquid polybutadiene, liquid 1,2-polybutadiene, liquid styrene-butadiene rubber, liquid polychloroprene, liquid silicone rubber, liquid fluorocarbon rubber, thermoplastic elastomer (for example, styrene-butadiene-styrene block copolymer, styrene-isoprene-styrene block copolymer, styrene-ethylene butylene-styrene block copolymer, or other styrene elastomers, olefin elastomer, ester elastomer, urethane elastomer, polyamide elastomer, polyvinyl chloride elastomer), or thermosetting elastomer (for example, urethane elastomer or silicone elastomer).

Among these, the preferred are the rubber wherein amino group and/or imino group is introduced on both ends of the NBR molecule. Exemplary such rubbers include commercially available rubbers such as HYCAR AT polymer ATBN1300×16 manufactured by Ube Industries, Ltd. and ATBN1300×45 manufactured by Ube Industries, Ltd. which is represented by the following formula (1):

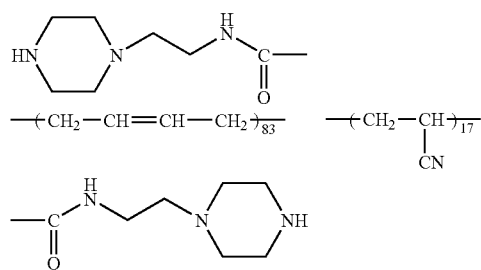

The bismaleimide compound used in the present invention is not particularly limited, and conventional known bismaleimide compound may be used. The preferred is the bismaleimide compound represented by the following formula (2):

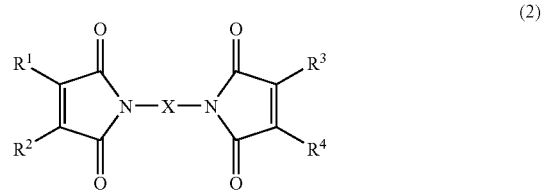

In the formula, $R^1$ to $R^4$ independently represent a group selected from a group consisting of —H, —$CH_3$, —$C_2H_5$, —$C_3H_7$, —F, —Cl, —Br, and —I; X represents an optionally substituted divalent acyclic aliphatic hydrocarbon group containing 1 to 24 carbon atoms; an optionally substituted cyclic aliphatic hydrocarbon group containing 5 to 18 carbon atoms; an optionally substituted divalent aromatic hydrocarbon group containing 6 to 18 carbon atoms; or a group containing at least one member selected from a group consisting of $SO_2$, O, N, and S in the above mentioned divalent group.

Exemplary X include simple bond and a group selected from the following formulae wherein p and q are independently an integer of at least 1.

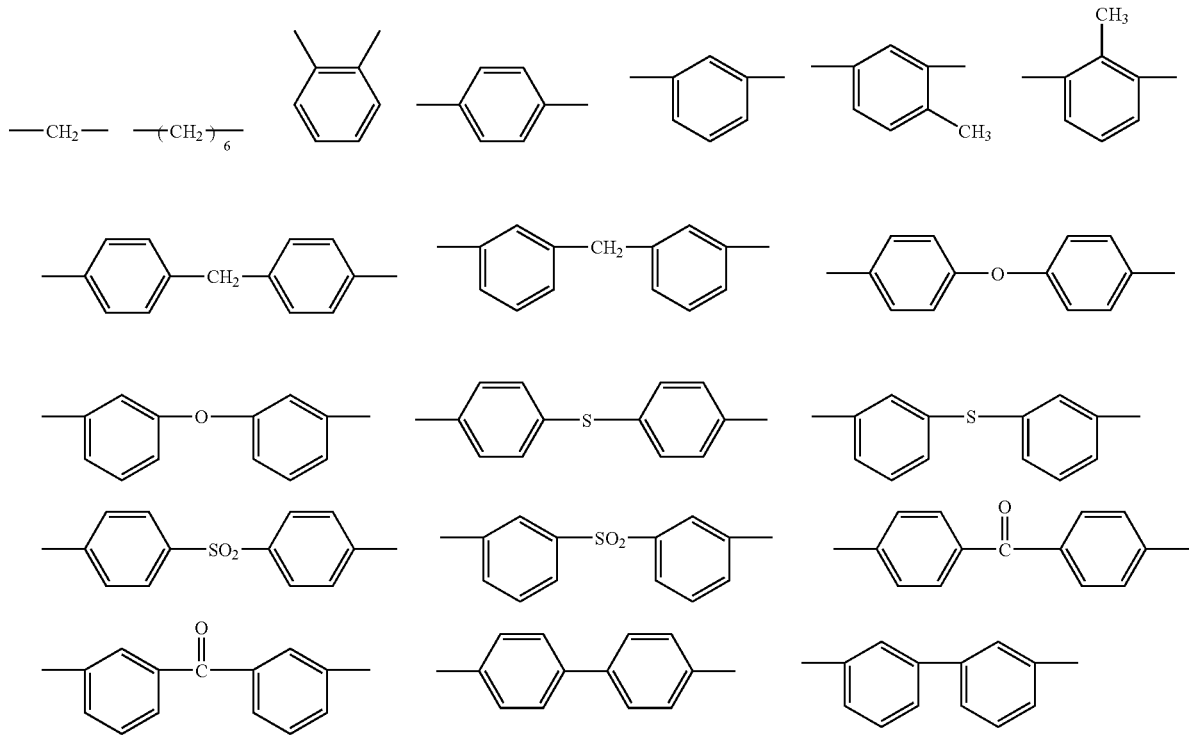

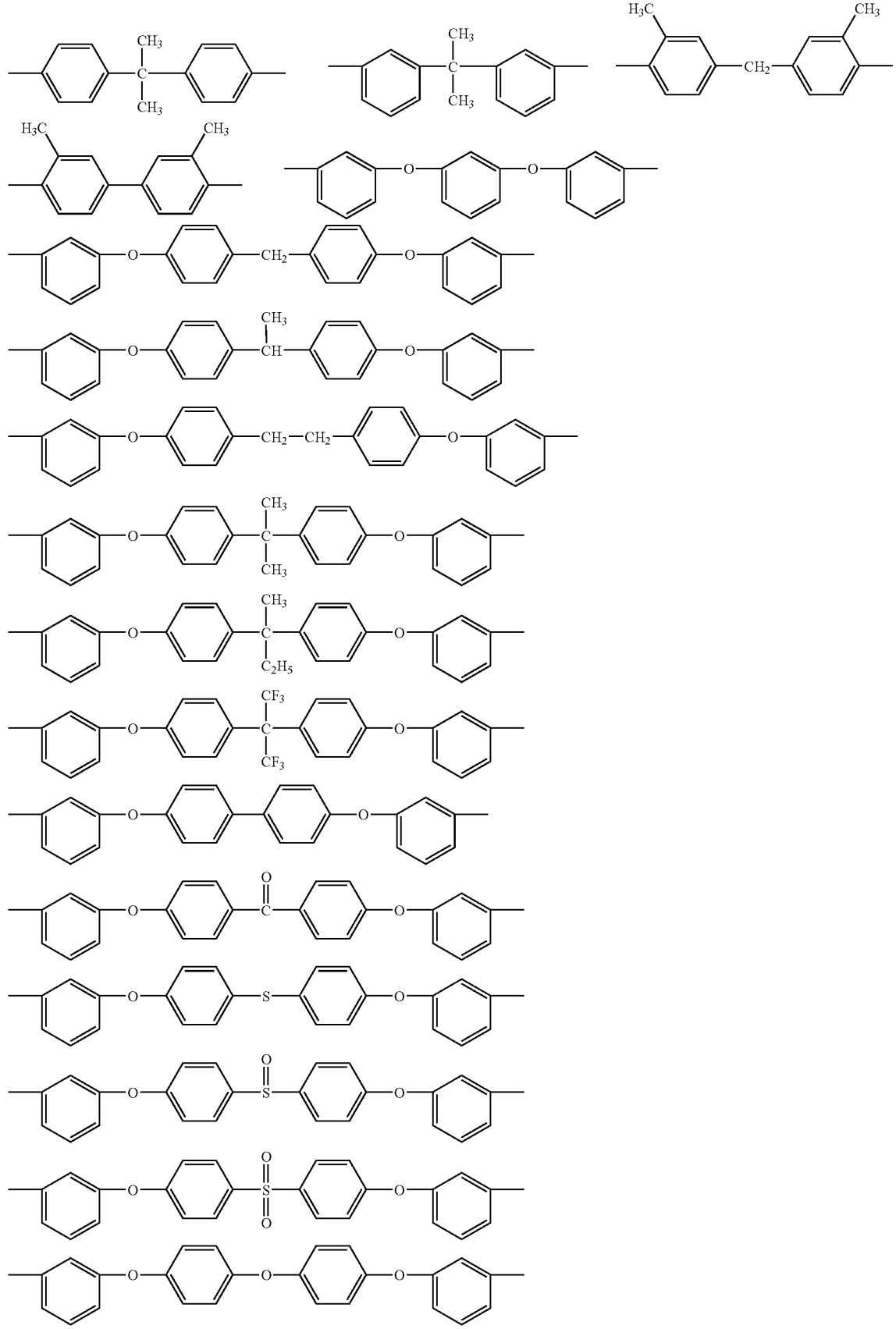

-continued

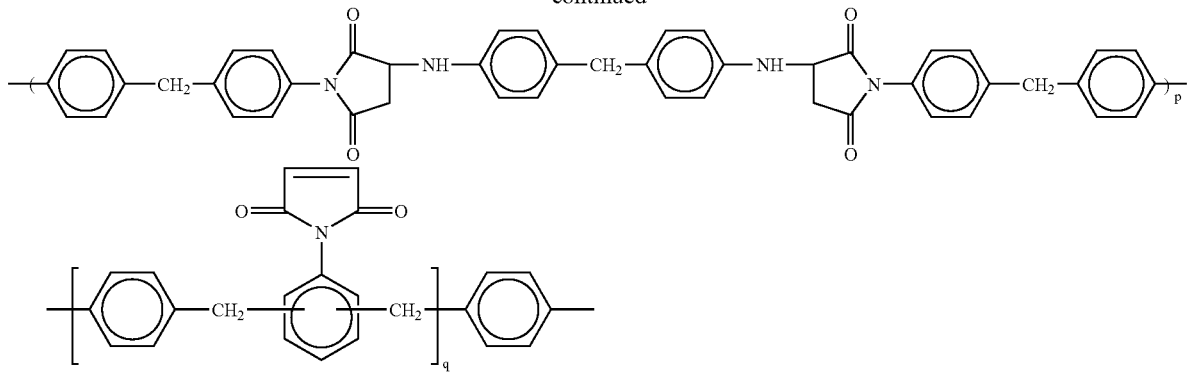

Among these, the preferred are a group selected from the following formulae.

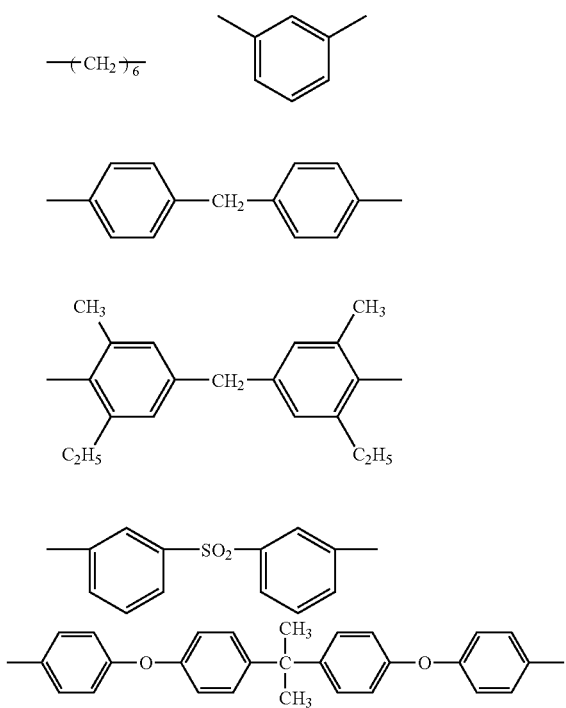

Exemplary bismaleimide compounds represented by the above formula (2) include 1,2-bismaleimide ethane, 1,6-bismaleimide hexane, N,N'-1,2-phenylenedimaleimide, N,N'-1,3-phenylenedimaleimide, N,N'-1,4-phenylenedimaleimide, N,N'-1,4-phenylene-2-methyldimaleimide, N,N'-(1,1'-biphenyl-4,4'-diyl)bismaleimide, N,N'-(3,3'-dimethyl-1,1'-biphenyl-4,4'-diyl)bismaleimide, 4,4'-diphenylmethane bismaleimide, N,N'-(methylenebis(2-chloro-4,1-phenylene)) bismaleimide, bis(3-ethyl-5-methyl-4-maleimide phenyl) methane, 2,2-bis(4-(4-maleimide phenoxy)phenyl)propane, N,N'- (sulfonylbis(1,3-phenylene)) dimaleimide, and N,N'-(4,4'-trimethyleneglycol dibenzoate)bismaleimide.

The bismaleimide compound used may also be a maleimide-modified polymer compound (for example, resin and rubber).

Among such compounds, the preferred are 1,6-bismaleimide hexane, 1,2-bismaleimide ethane, N,N'-1,3-phenylenedimaleimide, 4,4'-diphenylmethane bismaleimide, bis(3-ethyl-5-methyl-4-maleimide phenyl)methane, and 2,2-bis(4-(4-maleimide phenoxy)phenyl)propane in view of the cost.

The maleimide terminated rubber of the present invention may be obtained by reacting at least one rubber having amino group and/or imino group on both ends of the molecule and at least one bismaleimide compound so that the resulting compound has maleimide structure on both ends of the molecule.

In order to allow the reaction to proceed such that the resulting compound has maleimide structure on both ends of the molecule, the rubber and the bismaleimide compound are reacted such that the maleimide structure of the bismaleimide compound and the amino group and/or imino group on both ends of the rubber molecule are at the ratio in equivalent of preferably 1.05 to 2, and more preferably 1.05 to 1.5.

More specifically, the maleimide terminated rubber of the present invention may be obtained by mixing the rubber having amino group and/or imino group on both ends of the molecule and the bismaleimide compound as described above in the ratio as described above preferably in a solvent, and stirring the mixture at a temperature in the range of room temperature to 70° C. for 10 to 60 minutes. Typical solvents include methyl ethyl ketone (MEK), acetone, and N,N-dimethylformamide.

This reaction is schematically represented by the following formula:

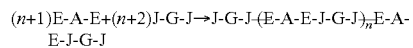

In the above formula, A represents backbone of the rubber, E represents amino group, imino group, or a moiety derived from such groups, and E-A-E represents the rubber having the amino group and/or the imino group on both ends of the molecule. G represents the moiety of the bismaleimide compound other than the maleimide structure, J represents the maleimide structure of the bismaleimide compound or a moiety derived from the maleimide structure, and J-G-J represents the bismaleimide compound. In each formula, the plurality of A, E, G, and J may independently represent two or more different moieties. n represents an integer of 0 or more.

The maleimide terminated rubber of the present invention may comprise two or more types of molecules wherein n is different, or two or more types of molecules wherein at least one of A, E, G, and J is different.

The maleimide terminated rubber of the present invention obtainable by the procedure as described above has maleimide structure on both ends of the molecule. The maleimide structure is represented by the following formula (3).

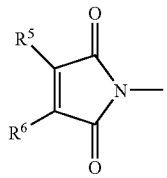 (3)

In the formula, $R^5$ and $R^6$ are independently a group selected from a group consisting of —H, —CH$_3$, —C$_2$H$_5$, —C$_3$H$_7$, —F, —Cl, —Br, and —I.

Among these, the combination of $R^5$ and $R^6$ is preferably —H and —H, or —H and —CH$_3$.

The maleimide terminated rubber of the present invention is not particularly limited for its molecular weight. However, the preferable weight average molecular weight is, for example, in the range of 1,000 to 100,000.

The maleimide terminated rubber of the present invention may also be a mixture of two or more rubbers each having different backbone, maleimide structure, or molecular weight.

As described above, the maleimide terminated rubber of the present invention has a rubber backbone and maleimide structures on both ends of the molecule. Accordingly, when the maleimide terminated rubber of the present invention is used in the curable composition of the present invention as will be described below, the cured product will exhibit excellent toughness due to the rubber backbone, and the molecular weight will be higher than the rubber having the amino group and/or imino group that had been used for the starting material. The product will also exhibit long term stability since the highly reactive amino group and/or imino group is blocked, and the maleimide structure has relatively low reactivity at ambient temperature.

Next, the curable composition of the present invention is described.

The curable composition of the present invention comprises the maleimide terminated rubber of the present invention and a resin and/or a rubber other than the maleimide terminated rubber of the present invention (hereinafter referred to as "the rubber other than the rubber of the invention").

The resin used in the curable composition of the present invention is not particularly limited, and any conventional known resin may be used as long as it has curability after incorporating in the composition. Exemplary resins include a resin which is curable by itself, a resin which is curable in the presence of a curing agent, a resin which is curable by reacting with the maleimide terminated rubber of the present invention, a resin which is curable by reacting with other resin and/or other rubber in the curable composition of the present invention.

Exemplary such resins include epoxy resin (for example, liquid epoxy resin and solid epoxy resin), oxetane resin, and maleimide resin. Among these, epoxy resin has the merits of excellent dynamic properties and heat resistance while it also suffers from insufficient toughness. However, when epoxy resin is incorporated in the curable composition of the present invention, the toughness will be improved, and the strength and other dynamic properties as well as the heat resistance will be further improved. Therefore, the curable composition of the present invention containing the epoxy resin constitutes a preferred embodiment of the present invention.

The rubber other than the rubber of the invention used in the curable composition of the present invention is not particularly limited, and any conventional known rubber may be used as long as it has curability when incorporated in the composition. Exemplary such rubbers include a rubber which is curable by itself, a rubber which is curable in the presence of a curing agent (vulcanizing agent), a rubber which is curable by reacting with the maleimide terminated rubber of the present invention, a rubber which is curable by reacting with other resin and/or other rubber in the curable composition of the present invention.

Exemplary such rubbers include a rubber having amino group and/or imino group on both ends of the molecule, diene rubber, and halogenated rubber.

The curable composition of the present invention may contain two or more types of the above-described resins and/or rubbers other than the rubber of the invention.

The curable composition of the present invention may further contain one or more resin and/or rubber other than the above-described resin and/or the rubber other than the rubber of the invention in an amount that does not adversely affects the merit of the present invention.

The curable composition of the present invention may contain a curing agent.

The curing agent used may be at least one conventional known agent adequately selected depending on the above-described resin and/or the rubber other than the rubber of the invention.

Among such curing agents, the preferred are those having a functional group capable of reacting with the maleimide structure. When the curable composition of the present invention contains a curing agent having a functional group capable of reacting with the maleimide structure, the cured product of the curable composition of the present invention will enjoy excellent properties including the strength owing to the reaction between the curing agent and the maleimide terminated rubber of the present invention that takes place in addition to the reaction between the curing agent and the resin and/or the rubber other than the rubber of the invention.

The functional group capable of reacting with the maleimide structure is not particularly limited. The functional group, however, is preferably at least one member selected from a group consisting of amino group, imino group, thiol group, and diene structure in view of the reactivity.

Among these, the functional group capable of reacting with the maleimide structure is preferably at least one member selected from a group consisting of amino group, imino group, and thiol group when epoxy resin is included in the curable composition of the present invention. These functional groups will react with the epoxy group in the epoxy resin, and also with the maleimide structure in the maleimide terminated rubber of the present invention, and therefore, the cured product of the curable composition of the present invention will enjoy excellent properties including the strength.

Exemplary curing agents having such functional group include 1,3-benzenethiol, 4,4'-diaminodiphenylsulfone (DDS), m-phenylenediamine, diaminodiphenylmethane, and polysulfide resin having thiol group on its end (for example, LP-3 manufactured by Thiokol Chem. Corp.).

Amount of the curing agent incorporated in the curable composition of the present invention is not particularly limited. Typically, the amount is preferably 10 to 100 parts by weight, and more preferably 10 to 50 parts by weight per 100 parts by weight of the resin and/or the rubber other than the rubber of the invention.

The curable composition of the present invention may further contain an additive such as plasticizer, filler, catalyst, solvent, UV absorbent, dye, pigment, flame retardant, reinforcing agent, antiaging agent, antioxidant, thixotropic agent, surfactant (including leveling agent), dispersant, dehydrator, anticorrosive, tackifier, and antistatic agent to the extent that the merits of the present invention are not adversely affected. These additives may be the one generally used in a rubber composition or a resin composition, and the additives may be used either alone or in combination of two or more.

The method for producing the curable composition of the present invention is not particularly limited, and the composition may be obtained, for example, by placing the essential and optional components as described above in the reaction vessel and fully kneading the mixture under reduced pressure by using an agitator such as blender.

The curable composition of the present invention has excellent toughness after curing as well as long term stability, and therefore, it is used in various applications depending on the resin and/or the rubber other than the rubber of the invention. Typical preferable application is composite molded article comprising the curable composition of the present invention and other materials.

The material, the shape and the like of other materials used in the composite molded article of the present invention are not particularly limited, and exemplary such materials include metal, resin molded article, reinforcement fiber, and fiber reinforced plastic (FRP).

Among various applications, a preferred embodiment is use of the composite molded article for a prepreg. A prepreg is an intermediate material used in the molding obtainable by impregnating a reinforcement fiber such as carbon fiber in the matrix resin, and the prepreg is used as a structural material in aircraft, automobile, and the like. Epoxy resin has been a typical material used for the matrix resin of the prepreg in view of the excellent dynamic properties, the heat resistance and the like.

When the composite molded material of the present invention is formed into a prepreg by using the curable composition of the present invention containing the epoxy resin, an extremely favorable product will be produced which enjoy excellent toughness in addition to the excellent dynamic properties (such as tensile strength and interlaminar shear strength) and heat resistance.

The fiber used as the reinforcement in the prepreg of the present invention is not particularly limited, and exemplary fibers include carbon fiber, glass fiber, and alamid fiber.

EXAMPLES

Next, the present invention is described in further detail by referring to the Examples, which by no means limit the scope of the present invention.

1. Preparation of the Maleimide Terminated Rubber of the Present Invention

The maleimide terminated rubber of the present invention was produced by mixing 100 g of the amine terminated rubber represented by the above formula (1) (amine terminated liquid NBR, HYCAR AT polymer ATBN1300×45 manufactured by Ube Industries, Ltd. having a weight average molecular weight of 3500 and an amine equivalent of 1900) and 10.8 g of 4,4'-diphenylmethane bismaleimide (the amounts were such that maleimide structure/imino group was 1.15) in 300 g of MEK and stirring the mixture at room temperature for 5 hours, and then, at 70° C. for 2 hours to be reacted (see the reaction scheme, below).

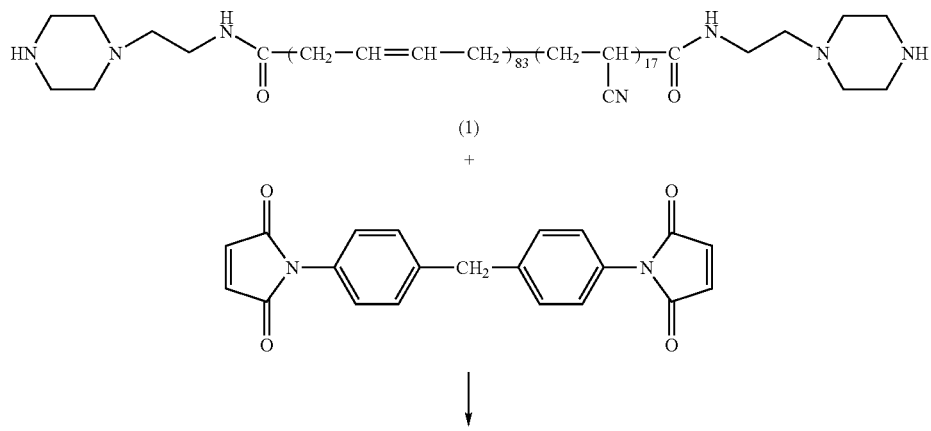

-continued

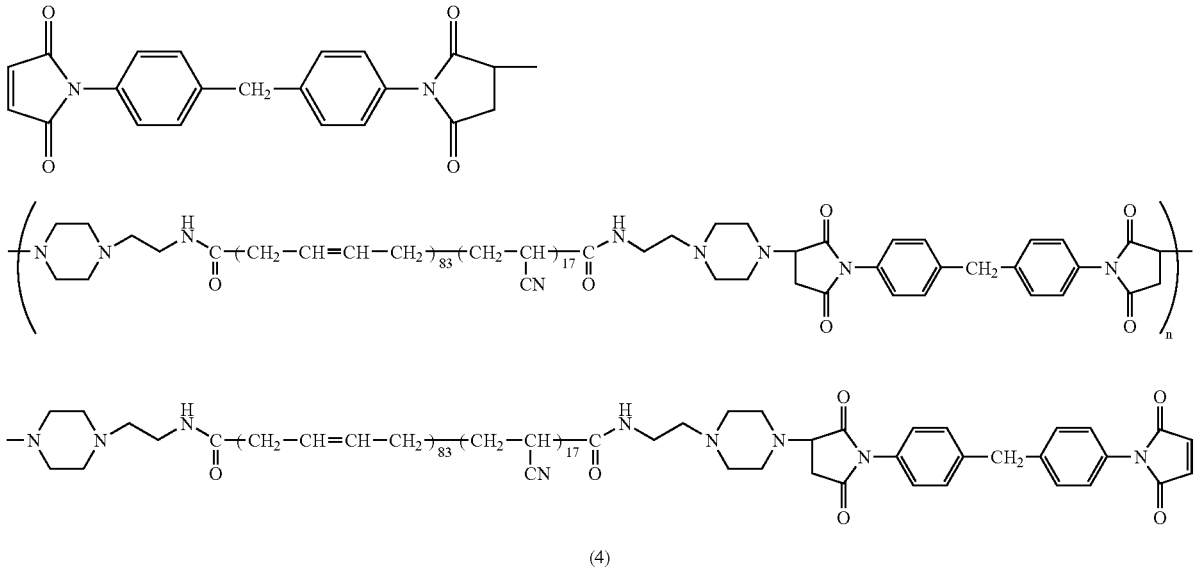

(4)

The maleimide terminated rubber of the present invention represented by the above formula (4) (wherein n represents the number of the recurring units) had a weight average molecular weight of 15,500.

2. Preparation of the Curable Composition (1)

Example 1 and Comparative Example 1

The starting materials as described below were mixed at the weight ratio as shown in Table 1 to produce various curable compositions.

Liquid epoxy resin 1: ELM434 manufactured by Sumitomo Chemical Co., Ltd.
Solid epoxy resin: Dicyclopentadiene epoxy resin, EPICLON HP-7200 manufactured by Dainippon Ink and Chemicals, Incorporated.
Liquid epoxy resin 2: Bisphenol A epoxy resin, YD-128 manufactured by Touto Kasei Corporation.
4,4'-diaminodiphenylsulfone (DDS): Seikacure-S manufactured by Wakayama Seika Kogyo Co., Ltd.
MEK
Amine terminated rubber: The amine terminated rubber (amine terminated liquid NBR, HYCAR AT polymer ATBN 1300×45, manufactured by Ube Industries, Ltd.)
Maleimide terminated rubber: The maleimide terminated rubber represented by the formula (4) produced by the procedure as described above.

TABLE 1

| | Comparative Example 1 | Example 1 |
|---|---|---|
| Liquid epoxy resin 1 | 70 | 70 |
| Solid epoxy resin | 25 | 25 |
| Liquid epoxy resin 2 | 5 | 5 |
| DDS | 31 | 31 |
| MEK | 100 | 100 |
| Amine terminated rubber | 10 | |
| Maleimide terminated rubber | | 10 |

3. Evaluation of Physical Properties (1)

The curable compositions produced in Example 1 and Comparative Example 1 were evaluated for their physical properties as described below.

(1) Long Term Stability

The curable compositions produced in Example 1 and Comparative Example 1 were stirred in MEK solvent at room temperature for 6 hours, and the stirring was continued for another 5 hours at reduced pressure and at 60° C. to remove the solvent. The condition of the curable compositions was visually observed, and the long term stability was evaluated by observing whether curing of the curable compositions had occurred or not.

(2) Appearance of the Cured Product

The curable compositions produced in Example 1 and Comparative Example 1 were stirred in MEK solvent at room temperature for 6 hours, and the stirring was continued for another 5 hours at reduced pressure and at 60° C. to remove the solvent. The curable compositions were then cured by allowing the compound to stand at 180° C. for 2 hours to thereby produce the cured products. The cured products were visually observed for their appearance.

(3) Glass Transition Temperature ($T_g$)

The cured product was obtained by the procedure similar to the evaluation of the appearance of the cured product. The resulting cured product was evaluated for the glass transition temperature ($T_g$) using a differential scanning calorimeter (DSC, model DSC2920, manufactured by TA Instrument Corporation).

The results of the evaluation of the physical properties are shown in Table 2. As demonstrated in Table 2, the curable composition of the present invention produced by using the maleimide terminated rubber of the present invention (Example 1) is superior in the long term stability and $T_g$ compared to the case using the amine terminated rubber (Comparative Example 1). In the observation of the cured products, the curable composition of the present invention (Example 1) was translucent indicating the absence of the phase separation between the rubber and the resin. On the other hand, in the case using the amine terminated rubber (Comparative Example 1), the composition was opaque indicating the occurrence of the phase separation.

TABLE 2

|  | Comparative Example 1 | Example 1 |
|---|---|---|
| Long term stability | Partial curing | Stable |
| Appearance of the cured product | Opaque | Translucent |
| $T_g$ (° C.) | 187 | 196 |

4. Preparation of the Curable Composition (2)

Examples 2 and 3 and Comparative Examples 2 and 3

The starting materials as described below were mixed at the weight ratio as shown in Table 3 to produce various curable compositions.

Polyfunctional epoxy resin: Tetrakis(glycidyloxy-phenyl) ethane, Epikote 1031S, manufactured by Japan Epoxy Resins Co., Ltd.

Solid epoxy resin: Dicyclopentadiene epoxy resin, EPICLON HP-7200 manufactured by Dainippon Ink and Chemicals, Incorporated.

Liquid epoxy resin 2: Bisphenol A epoxy resin, YD-128 manufactured by Touto Kasei Corporation.

Liquid epoxy resin 3: Naphthalene epoxy resin, EPICLON HP-4032 manufactured by Dainippon Ink and Chemicals, Incorporated.

4,4'-diaminodiphenylsulfone (DDS): Seikacure S manufactured by Wakayama Seika Kogyo Co., Ltd.

$BF_3MEA$: Trifluoromonoethylamine complex manufactured by Stella Chemifa Corporation.

Maleimide terminated rubber: The maleimide terminated rubber represented by the formula (4) produced by the procedure as described above.

Carboxylated NBR: Nipol-1072 manufactured by ZEON Corporation, degree of carboxylation 5%.

TABLE 3

|  | Example 2 | Comparative Example 2 | Example 3 | Comparative Example 3 |
|---|---|---|---|---|
| Polyfunctional epoxy resin | 21 | 21 | 29 | 29 |
| Solid epoxy resin | 15 | 15 |  |  |
| Liquid epoxy resin 2 | 32 | 32 | 28 | 28 |
| Liquid epoxy resin 3 | 32 | 32 | 43 | 43 |
| DDS | 28 | 28 | 30 | 30 |
| $BF_3MEA$ | 0.5 | 0.5 | 0.5 | 0.5 |
| Maleimide terminated rubber | 2 |  | 2 |  |
| Carboxylated NBR |  | 2 |  | 2 |

5. Production of Fiber Reinforced Composite Material

The curable compositions produced in Examples 2 and 3 and Comparative Examples 2 and 3 were used to produce the fiber reinforced composite materials as described below.

The curable composition was coated on a release paper using a reverse roll coater to produce a resin film. A sheet of carbon fibers aligned in one direction (Torayca T800HB, manufactured by Toray Industries, Inc., tensile modulus 294 GPa) was then sandwiched between two of the thus produced resin films, and the fibers were impregnated with the resin by applying pressure and heat to produce a unidirectional prepreg. The resulting unidirectional prepreg had a carbon fiber weight of 196±5 g/cm² and matrix resin ratio of 34% by weight.

10 sheets of the thus obtained unidirectional prepregs were stack one on another with the carbon fibers aligned in the same direction, and the laminate was heated by using an autoclave to 180° C. at a temperature elevation rate of 2° C./minute, and the conditions of 180° C. and 0.59 MPa were retained for 2 hours to thereby form fiber reinforced composite material sheet.

6. Evaluation of Physical Properties (2)

The thus produced unidirectional prepreg and the fiber reinforced composite material were evaluated for physical properties by the procedure as described below.

(1) Tack and Drape of the Unidirectional Prepreg

The as-produced two sheets of unidirectional prepregs were stack one on another, and the prepregs were then manually separated to sensually evaluate the degree of tackiness (tack). The as-produced unidirectional prepreg was also manually bent to sensually evaluate the presence of drape. The evaluations were carried out at 25° C.

The unidirectional prepregs which had been left in the room at 25° C. for 10 days after its production were also evaluated by the same procedure.

(2) Interlaminar Shear Strength of the Fiber Reinforced Composite Material

Test pieces each having a length in the fiber direction of 20 mm, a width in the direction vertical to the fiber direction of 10 mm, and a thickness of 1.87 mm were cut out of the fiber reinforced composite material sheet, and bending test was carried out for these test pieces by using an autograph in accordance with the method of JIS K7203-1995. The bending test was carried out by three-point bending using a span length of 10 mm and a test speed of 1 mm/minute, and the interlaminar shear strength was calculated by the following formula. The bending test was conducted at 25° C., 90° C., and 120° C., respectively.

Interlaminar shear strength=load at break/(test piece width×test piece thickness)×¾

(3) 90 Degree Tensile Strength of the Fiber Reinforced Composite Material

Test pieces each having a length in the fiber direction of 25 mm, a width in the direction vertical to the fiber direction of 250 mm, and a thickness of 1.87 mm were cut out of the fiber reinforced composite material sheet, and tensile test at 90 degrees in relation to the fiber direction was carried out for these test pieces by using an autograph in accordance with the method of ASTM D3039. The tensile test was carried out at grip length of 50 mm and test speed of 0.5 mm/minute, and the 90 degree tensile strength was calculated by the following formula. The bending test was conducted at 25° C.

90 degree tensile strength=load at break/(test piece width×test piece thickness)

The results of the evaluation of the physical properties for the unidirectional prepreg are shown in Table 4. As demonstrated in Table 4, the curable composition of the present invention produced by using the maleimide terminated rubber of the present invention (Examples 2 and 3) is superior in the tackiness and drape and their long term stability when prepared into a prepreg compared to the case using carboxylated NBR (Comparative Examples 2 and 3) exhibiting inferior long term stability.

The results of the evaluation of the physical properties for fiber reinforced composite material are shown in Table 5. As demonstrated in Table 5, the curable composition of the present invention produced by using the maleimide terminated rubber of the present invention (Examples 2 and 3) is superior in the strength, and in particular, in the strength at high temperature when prepared into the fiber reinforced composite material compared to the case using carboxylated NBR (Comparative Examples 2 and 3).

TABLE 4

|  | Example 2 | Comparative Example 2 | Example 3 | Comparative Example 3 |
|---|---|---|---|---|
| Tack |  |  |  |  |
| As produced | Detected | Detected | Detected | Detected |
| 10 days after the production | Detected | Not Detected | Detected | Not Detected |
| Drape |  |  |  |  |
| As produced | Present | Present | Present | Present |
| 10 days after the production | Present | Not Present | Present | Not Present |

TABLE 5

|  | Example 2 | Comparative Example 2 | Example 3 | Comparative Example 3 |
|---|---|---|---|---|
| Interlaminar shear strength (MPa) |  |  |  |  |
| 25° C. | 120.7 | 112.1 | 121.8 | 113.7 |
| 90° C. | 89.5 | 86.3 | 94.5 | 88.0 |
| 120° C. | 80.7 | 73.2 | 85.1 | 77.4 |
| 90 degree tensile strength (MPa) | 85.2 | 76.3 | 85.5 | 69.4 |

The invention claimed is:

1. A curable composition comprising the maleimide terminated rubber, an epoxy resin, and a curing agent having a functional group capable of reacting with the maleimide structure; wherein the maleimide terminated rubber is the reaction product of a rubber having an imino group on both ends of the rubber molecule and a bismaleimide compound; and wherein the functional group of said curing agent is at least one member selected from the group consisting of an amino group, an imino group, and a thiol group.

2. A prepreg comprising the curable composition of claim 1 and a reinforcement fiber, wherein said prepreg is obtained by impregnating the reinforcement fiber with the curable composition.

* * * * *